US012627496B2

(12) United States Patent
Pham et al.

(10) Patent No.: US 12,627,496 B2
(45) Date of Patent: May 12, 2026

(54) SECURE ACCESS TO VEHICLE ELECTRONIC CONTROL UNIT (ECU)

(71) Applicant: Innova Electronics Corporation, Irvine, CA (US)

(72) Inventors: Phuong Pham, Fountain Valley, CA (US); Keith Andreasen, Garden Grove, CA (US); Ly Bach, Ho Chi Minh City (VN); Khanh Le, Ho Chi Minh City (VN); Hoang Nguyen, Ho Chi Minh City (VN)

(73) Assignee: Innova Electronics Corporation, Irvine, CA (US)

( * ) Notice: Subject to any disclaimer, the term of this patent is extended or adjusted under 35 U.S.C. 154(b) by 127 days.

(21) Appl. No.: 18/742,827

(22) Filed: Jun. 13, 2024

(65) Prior Publication Data
US 2025/0385791 A1 Dec. 18, 2025

(51) Int. Cl.
*H04L 9/30* (2006.01)
*G07C 5/00* (2006.01)
*H04L 9/08* (2006.01)
(52) U.S. Cl.
CPC .............. *H04L 9/30* (2013.01); *G07C 5/008* (2013.01); *H04L 9/0822* (2013.01)
(58) Field of Classification Search
CPC .......... H04L 9/30; H04L 9/0822; G07C 5/008
See application file for complete search history.

(56) References Cited

U.S. PATENT DOCUMENTS

| | | | |
|---|---|---|---|
| 9,280,653 B2 | 3/2016 | Forest | |
| 2016/0035148 A1* | 2/2016 | Huang | H04L 9/0866 |
| | | | 701/31.4 |
| 2016/0350735 A1* | 12/2016 | Russell | G06Q 20/3276 |
| 2018/0151005 A1* | 5/2018 | Ahn | G07C 5/0808 |
| 2018/0254903 A1* | 9/2018 | Bardelski | G06F 21/72 |
| 2021/0312723 A1* | 10/2021 | Santos | G07C 5/008 |

FOREIGN PATENT DOCUMENTS

CN 117831158 A * 4/2024 ........... H04L 9/0894

OTHER PUBLICATIONS

Machine Translated CN-117831158-A (Year: 2024).*

* cited by examiner

*Primary Examiner* — Anne Marie Antonucci
*Assistant Examiner* — Misa H Nguyen
(74) *Attorney, Agent, or Firm* — Stetina Garred Brucker & Newboles

(57) ABSTRACT

A method of supporting secure access to an electronic control unit (ECU) of a vehicle may comprise receiving, from a diagnostic tool connected to the vehicle, encrypted data including an ECU address corresponding to the ECU, vehicle identification information of the vehicle, and a security seed, decrypting the encrypted data, retrieving, from a database, an initialization vector based on the ECU address and the vehicle identification information, calculating a security key based on the initialization vector and the security seed using an application programming interface (API) associated with an original equipment manufacturer (OEM) of the ECU, encrypting the security key, and sending the encrypted security key to the diagnostic tool to be decrypted and used by the diagnostic tool to gain secure access to the ECU.

18 Claims, 7 Drawing Sheets

SECURE ACCESS TO VEHICLE ELECTRONIC CONTROL UNIT (ECU)

CROSS-REFERENCE TO RELATED APPLICATIONS

Not Applicable

STATEMENT RE: FEDERALLY SPONSORED RESEARCH/DEVELOPMENT

Not Applicable

BACKGROUND

Due to safety and security concerns, vehicle manufacturers typically limit access to a vehicle's electronic control unit(s) (ECU) and other onboard computer systems. For instance, a third-party scan tool or other diagnostic tool may be able to connect to the vehicle (e.g., via a data port) in order to download diagnostic trouble codes (DTC) from the ECU but may be unable to send commands to the ECU as may be required for more advanced diagnostics. The original equipment manufacturer (OEM) may prefer to limit such functionality to known, identified users in order to implement two-factor authentication. In the case of a non-dealer user attempting to access an engine immobilizer or reprogram a key, for example, a first authentication factor may be the OEM's scan tool requiring the user to have an authentic account or license to be able to use the needed software/program, and a second authentication factor may be the user providing a Vehicle Security Professional (VSP) authentication code in order to prove that he/she is a certified technician as managed by the National Automotive Service Task Force (NASTF) as part of its Secure Data Release Model (SDRM).

In order for the OEM's scan tool to authenticate the user (as in the above example of a first authentication factor), the manufacturer may install needed data and/or algorithms for authorizing access to the ECU directly to an integrated microprocessor inside the scan tool, effectively requiring the advanced user to connect to the vehicle using the vehicle manufacturer's own diagnostic tool. See, e.g., U.S. Pat. No. 9,280,653, entitled "Security Access Method for Automotive Electronic Control Units," owned by GM Global Technology Operations LLC. Unfortunately, except in exceptional circumstances such as accessing an engine immobilizer or reprogramming a key that may require NASTF certification, such manufacturer-installed algorithms do not support two-factor authentication. In addition, the technical limitation of pre-installing the necessary data/algorithms in the scan tool puts a burden on the automotive service industry, as a mechanic may be required to own and maintain many different diagnostic tools corresponding to each type of vehicle. Moreover, since aftermarket diagnostic tools including the most advanced features may have no way of accessing the necessary functionality of the ECU, the customers of the vehicle manufacturers are often unable to take advantage of the latest advances in vehicle diagnostics. While contractual agreements and other business solutions to this problem may to some degree allow vehicle manufacturers to incorporate third-party diagnostics in their proprietary scan tools, what is needed is a technical solution to the underlying security concern of authenticating a third-party diagnostic tool.

BRIEF SUMMARY

One aspect of the embodiments of the present disclosure is a method of supporting secure access to an electronic control unit (ECU) of a vehicle. The method may comprise receiving, from a diagnostic tool connected to the vehicle, encrypted data including an ECU address corresponding to the ECU, vehicle identification information of the vehicle, and a security seed, decrypting the encrypted data, retrieving, from a database, an initialization vector based on the ECU address and the vehicle identification information, calculating a security key based on the initialization vector and the security seed using an application programming interface (API) associated with an original equipment manufacturer (OEM) of the ECU, encrypting the security key, and sending the encrypted security key to the diagnostic tool to be decrypted and used by the diagnostic tool to gain secure access to the ECU.

The encrypted data may further include a global unique identification number (GUID) of the diagnostic tool. The method may comprise validating the GUID prior to retrieving the initialize vector from the database. The retrieving of the initialization vector from the database may include finding a match in the database corresponding to the ECU address and the vehicle identification information. The vehicle identification information may include a year, make, and model of the vehicle. The calculating of the security key may be further based on an encrypted fixed byte associated with the initialization vector. The method may comprise, prior to the calculating of the security key, decrypting the encrypted fixed byte using the initialization vector and a secret key. The decrypting, the retrieving, the calculating, the encrypting, and the sending may proceed autonomously in response to the receiving of the encrypted data from the diagnostic tool.

Another aspect of the embodiments of the present disclosure is a computer program product comprising one or more non-transitory program storage media on which are stored instructions executable by one or more processors or programmable circuits to perform operations for supporting secure access to an electronic control unit (ECU) of a vehicle. The operations may comprise receiving, from a diagnostic tool connected to the vehicle, encrypted data including an ECU address corresponding to the ECU, vehicle identification information of the vehicle, and a security seed, decrypting the encrypted data, retrieving, from a database, an initialization vector based on the ECU address and the vehicle identification information, calculating a security key based on the initialization vector and the security seed using an application programming interface (API) associated with an original equipment manufacturer (OEM) of the ECU, encrypting the security key, and sending the encrypted security key to the diagnostic tool to be decrypted and used by the diagnostic tool to gain secure access to the ECU.

The encrypted data may further include a global unique identification number (GUID) of the diagnostic tool. The operations may comprise validating the GUID prior to retrieving the initialize vector from the database. The retrieving of the initialization vector from the database may include finding a match in the database corresponding to the ECU address and the vehicle identification information. The vehicle identification information may include a year, make, and model of the vehicle. The calculating of the security key may be further based on an encrypted fixed byte associated with the initialization vector. The operations may comprise, prior to the calculating of the security key, decrypting the encrypted fixed byte using the initialization vector and a secret key.

Another aspect of the embodiments of the present disclosure is a system for supporting secure access to an electronic control unit (ECU) of a vehicle. The system may comprise a diagnostic tool and one or more servers. The diagnostic tool may be operable to connect to the vehicle and to retrieve, from the vehicle, an ECU address corresponding to the ECU, vehicle identification information of the vehicle, and a security seed. The diagnostic tool may further be operable to encrypt data including the ECU address, the vehicle identification information, and the security seed. The one or more servers may be operable to receive the encrypted data from the diagnostic tool, to decrypt the encrypted data, and to retrieve, from a database, an initialization vector based on the ECU address and the vehicle identification information. The one or more servers may further be operable to calculate a security key based on the initialization vector and the security seed using an application programming interface (API) associated with an original equipment manufacturer (OEM) of the ECU, to encrypt the security key, and to send the encrypted security key to the diagnostic tool to be decrypted and used by the diagnostic tool to gain secure access to the ECU.

The encrypted data may further include a global unique identification number (GUID) of the diagnostic tool. The one or more servers may further be operable to validate the GUID prior to retrieving the initialize vector from the database. The retrieving of the initialization vector by the one or more servers may include finding a match in the database corresponding to the ECU address and the vehicle identification information. The vehicle identification information may include a year, make, and model of the vehicle. The calculating of the security key by the one or more servers may be further based on an encrypted fixed byte associated with the initialization vector. The one or more servers may be operable to decrypt the encrypted fixed byte using the initialization vector and a secret key prior to calculating the security key. The diagnostic tool may be operable to connect to the vehicle via a data port of the vehicle. The diagnostic tool may be operable to connect to the vehicle at least in part via a wireless communication protocol, such as via a short-range wireless connection (e.g., Bluetooth) between a smartphone and a dongle plugged into a data port of the vehicle. The one or more servers may be operable to decrypt the encrypted data, retrieve the initialization vector, calculate the security key, encrypt the security key, and send the encrypted security key to the diagnostic tool autonomously in response to receiving the encrypted data from the diagnostic tool. The diagnostic tool may be operable to encrypt the data including the ECU address, the vehicle identification information, and the security seed (and in some cases the GUID identifying the particular diagnostic tool) and send the encrypted data to the one or more servers autonomously in response to retrieving the ECU address, the vehicle identification information, and the security seed from the vehicle.

Another aspect of the embodiments of the present disclosure is a diagnostic tool for securely accessing an electronic control unit (ECU) of a vehicle. The diagnostic tool may be operable to connect to the vehicle and retrieve, from the vehicle, an ECU address corresponding to the ECU, vehicle identification information of the vehicle, and a security seed. The diagnostic tool may comprise one or more processors operable to encrypt data including the ECU address, the vehicle identification information, and the security seed and to send the encrypted data to one or more servers. The one or more processors may be further operable to receive an encrypted security key from the one or more servers, to decrypt the encrypted security key, and to use the decrypted security key to gain secure access to the ECU.

The encrypted data may include a global unique identification number (GUID) of the diagnostic tool. The diagnostic tool may be operable to encrypt the data including the ECU address, the vehicle identification information, the security seed, and the GUID and send the encrypted data to the one or more servers autonomously in response to retrieving the ECU address, the vehicle identification information, and the security seed from the vehicle. The diagnostic tool may be operable to connect to the vehicle via a data port of the vehicle.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, methods, and devices for use in vehicle diagnostics. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
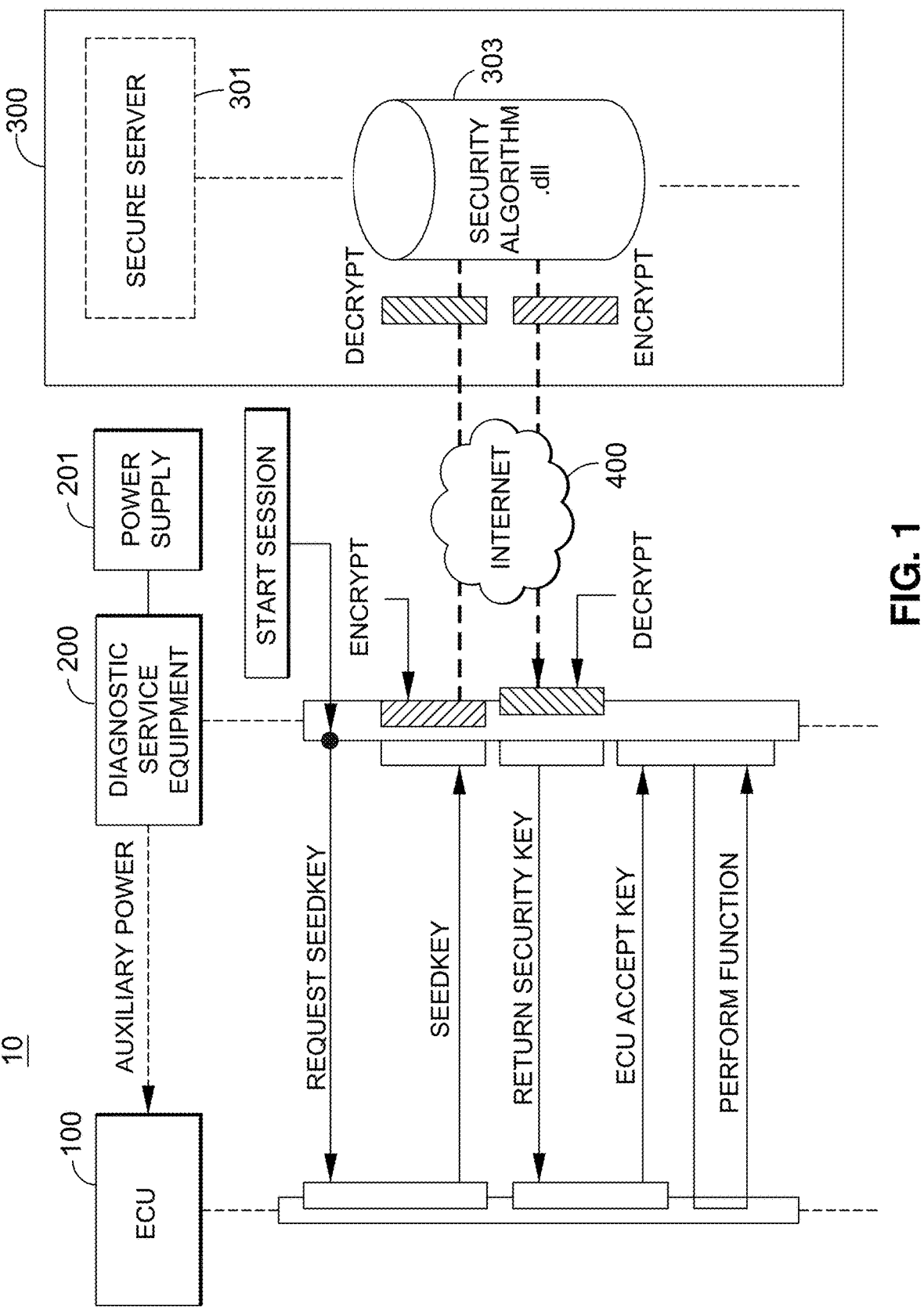
FIG. 1 shows a system for supporting secure access to an electronic control unit (ECU) of a vehicle according to an embodiment of the present disclosure.

FIG. 1 shows a system 10 for supporting secure access to an electronic control unit (ECU) 100 of a vehicle according to an embodiment of the present disclosure. The system 10 may include diagnostic service equipment such as a diagnostic tool 200 that is capable of retrieving diagnostic data from the ECU 100. The diagnostic tool 200 may comprise a scan tool or a dongle and may be operable to connect to the vehicle via a data port of the vehicle such as an on-board diagnostics (OBD) port and/or via a wireless communication protocol such as a short-range wireless communication protocol (e.g., Bluetooth). In some cases, the diagnostic tool 200 may comprise a combination of a scan tool or dongle with a mobile communication device (e.g., smartphone, tablet, etc.), in which case the diagnostic tool 200 may connected to the vehicle via both a wireless communication protocol (e.g., between the mobile communication device and the dongle) and via the data port (e.g., between the dongle and the vehicle).

In order to access certain features of the ECU 100, the diagnostic tool 200 may undergo an authentication process such as two-factor authentication on behalf of the user, either autonomously upon connection of the diagnostic tool 200 to the vehicle or in response to a command initiated by the user (e.g., on a user interface of the diagnostic tool 200 or the vehicle). In this regard, the diagnostic tool 200 may be operable to retrieve authentication information including a security seed ("SEEDKEY" in FIG. 1) from the ECU 100 and communicate with one or more servers 301 of a backend system 300 controlled by an entity that may be a third party (i.e., distinct from the manufacturer of the vehicle) and may be the manufacturer of the diagnostic tool 200, for example. If the authentication is successful, the one more servers 301 may provide a security key ("SECURITY KEY" in FIG. 1) to the diagnostic tool 200, which may be used by the diagnostic tool 200 to access the desired features of the ECU 100 ("PERFORM FUNCTION" in FIG. 1). In this way, secure authentication, including two-factor authentication, may be performed over-the-air (e.g., via Internet 400), without there needing to be vehicle-specific authentication data stored in the diagnostic tool 200 itself as may conventionally be the case when using the vehicle manufacturer's own scan tool. As such, the user may make use of a third-party diagnostic tool 200 without sacrificing the security afforded by such conventional two-factor authentication techniques.

Figure 2:
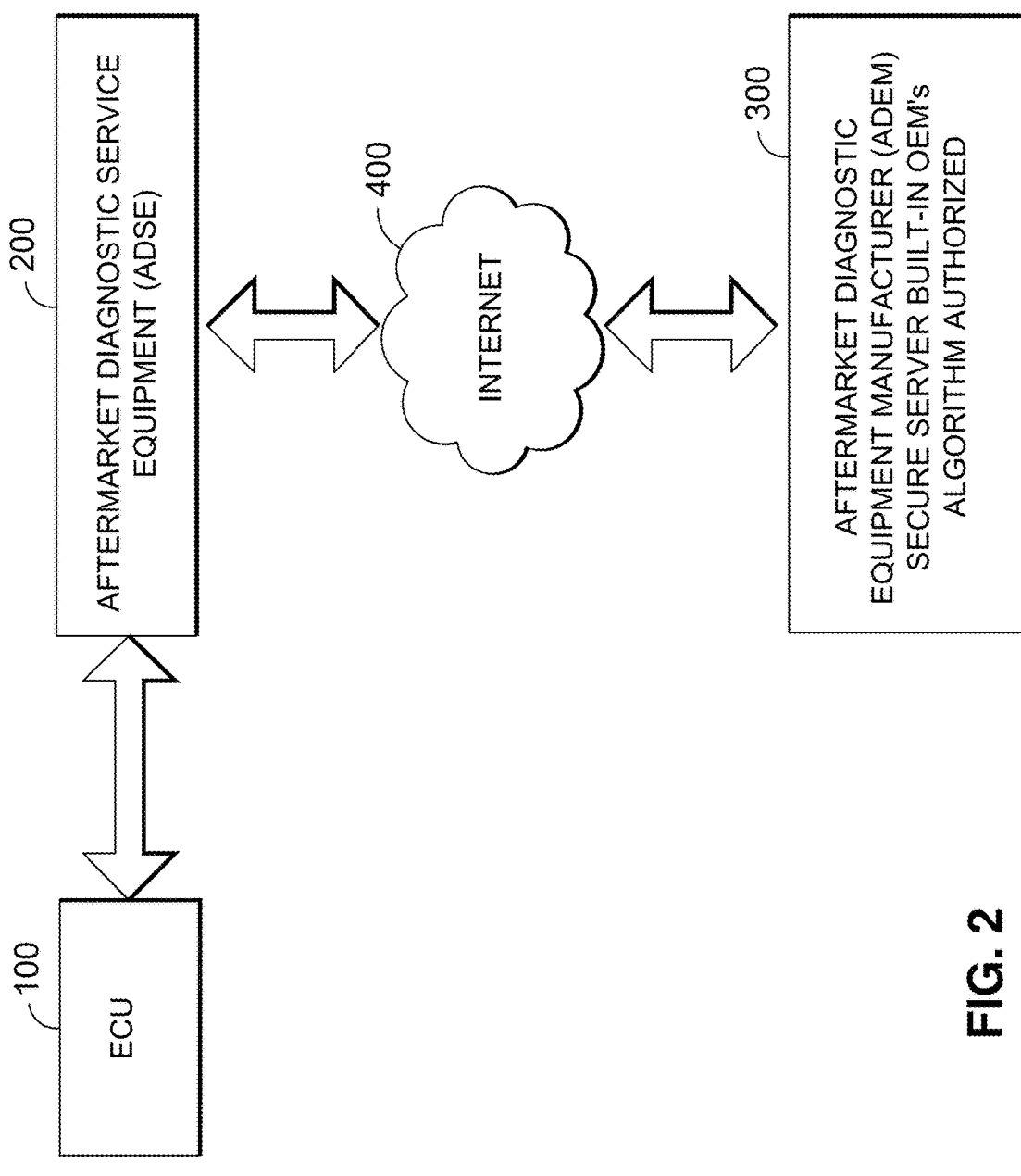
FIG. 2 shows an overview of an operational flow of the system.

Referring to FIGS. 2 and 3A-3E, an example operational flow of the system 10 will now be described in relation to an aftermarket diagnostic service equipment (ADSE) serving as the diagnostic tool 200 and one or more secure servers of an aftermarket diagnostic equipment manufacturer (ADEM) serving as the entity controlling the backend system 300 having the one or more servers 301. As noted in FIG. 2 and described in more detail below, the backend system 300 may make use of a built-in algorithm authorized by the original equipment manufacturer (OEM) of the ECU 100 (e.g., the manufacturer of the vehicle). Such algorithm may be stored in one or more data storages 303 (see FIG. 1) of the backend system 300, for example. FIG. 2 shows an overview of the communication paths for the various processes that are detailed in FIGS. 3A-3E.

Figure 3A:
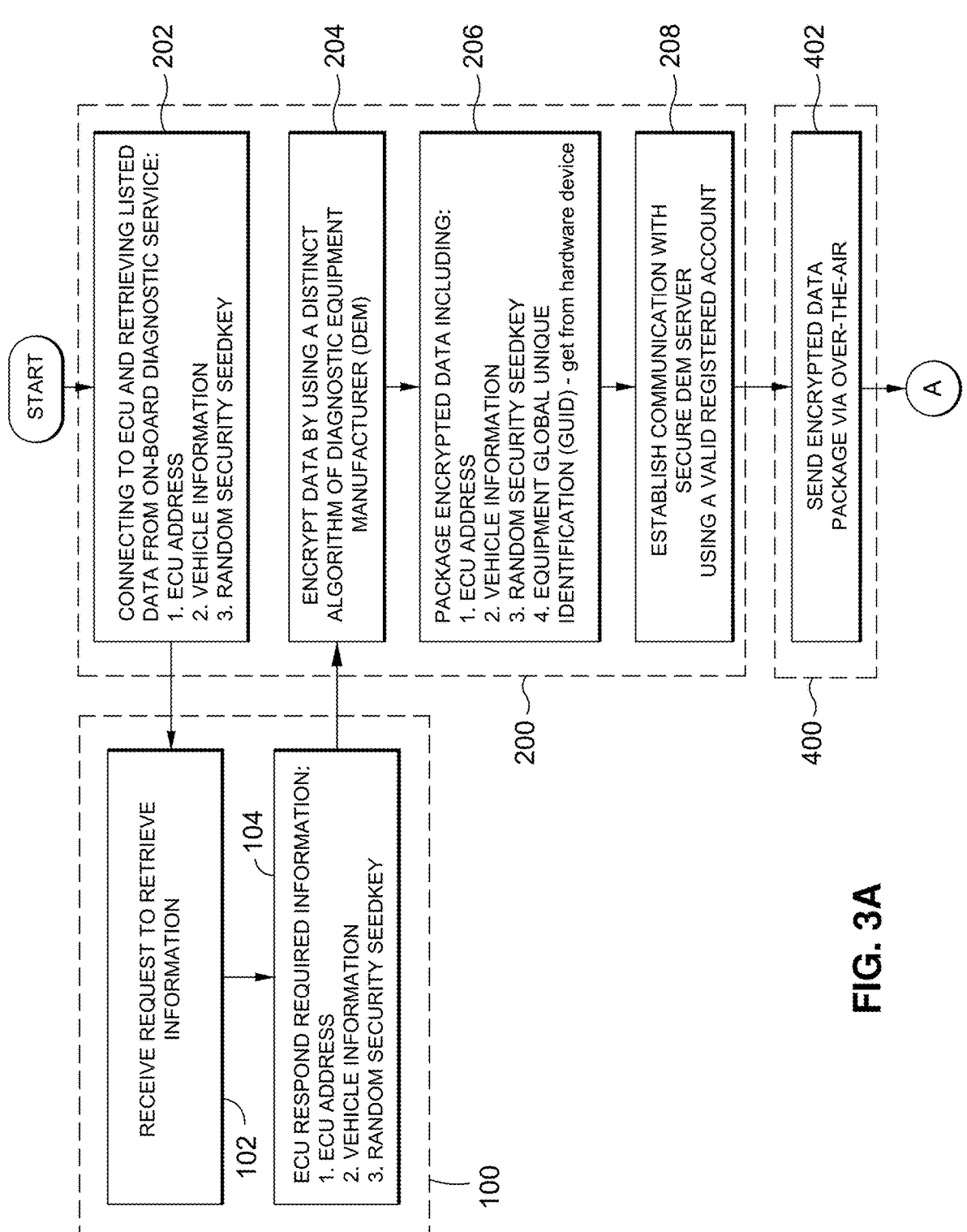
FIG. 3A shows a first portion of the operational flow.

As shown in FIG. 3A, the operational flow may begin ("START") with the diagnostic tool 200 connecting to the vehicle and requesting authentication (step 202), e.g., by sending a "request seedKey (SeedByte)" service command to the ECU 100. The ECU 100 may receive the request (step 102) and respond with an ECU address corresponding to the ECU 100, vehicle identification information of the vehicle (e.g., year, make, model, engine, etc.), and a security seed (e.g., a random hexadecimal number). The ECU address may represent a particular type of ECU (e.g., anti-lock braking system, powertrain control module, etc.) that is communicating on a protocol (e.g., ISO-14229, ISO-15765) and may exist as a hexadecimal number equivalent to a name or model of the ECU. In this way, the diagnostic tool 200 may retrieve the ECU address, the vehicle identification information, and the security seed. Upon receipt of this data, the diagnostic tool 200 may encrypt the data (step 204). The encryption scheme may use an algorithm known only to the manufacturer of the diagnostic tool 200, for example, which may be the same as the entity controlling the back-end system 300 having the one or more servers 301 as noted above. The diagnostic tool 200 may then package the encrypted data (step 206). In order to validate the identity of the diagnostic tool 200 (e.g., to ensure that it is an authorized diagnostic tool 200), the package of encrypted data may additionally include a global unique identification number (GUID) of the diagnostic tool 200, which may be stored on the diagnostic tool 200 itself (e.g., in firmware). The diagnostic tool 200 may establish communication with the one or more servers 301 of the backend system 300 using a valid, registered account associated with the diagnostic tool 200 (step 208), preferably by connecting to the Internet 400 via Wi-Fi (e.g., using an IEEE 802.11 protocol) and/or Global System for Mobile Communications (GSM) protocol such as 4G, 5G, etc. In this way, the encrypted data may be sent over-the-air (step 402) to continue the authentication process remotely.

Figure 3B:
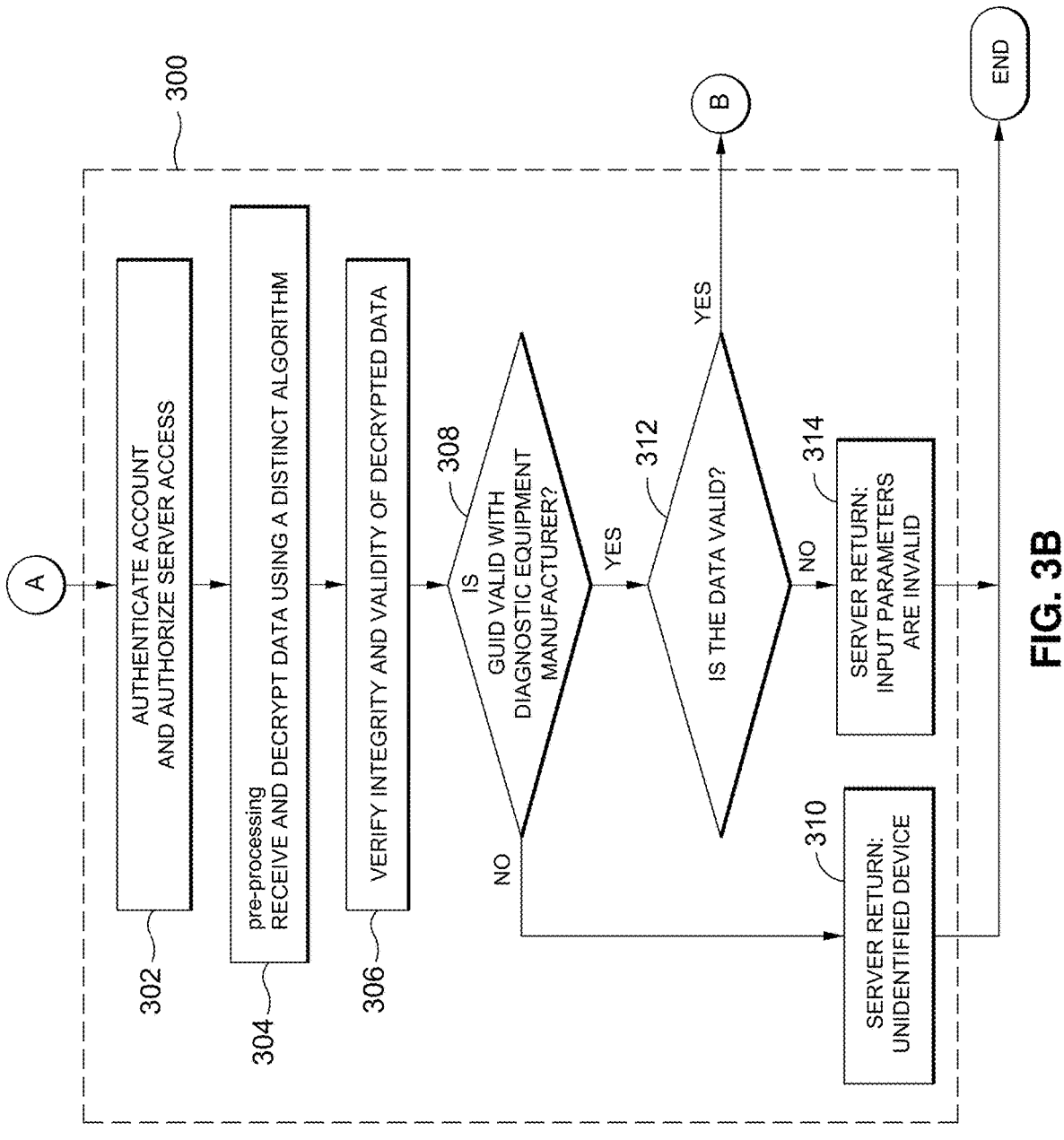
FIG. 3B shows a second portion of the operational flow.

Referring to FIG. 3B, the operational flow may continue with one or more servers 301 of the back-end system 300 authenticating the valid, registered account associated with the diagnostic tool 200 to authorize server access (step 302). The account may be provided by the ADEM for each user's diagnostic tool 200, for example. The one or more servers 301 of the back-end system 300 may then receive the encrypted data from the diagnostic tool 200 and decrypt the encrypted data (step 304). As noted above, the encryption scheme may use an algorithm known only to the manufacturer of the diagnostic tool 200, which may be the same as the entity controlling the backend system 300 having the one or more servers 301. The one or more servers 301 may decrypt the encrypted data using this same algorithm. The decrypted data may include the ECU address, the vehicle identification information, the security seed, and the GUID. In order to verify the integrity and validity of the decrypted data (step 306), the one or more servers 301 of the backend system 300 may first check whether the GUID is valid with the ADEM (step 308). If it is not (e.g., if the GUID does not match any known GUID of the ADEM), then the one or more servers 301 may return data indicative of the diagnostic tool 200 being an unidentified device (step 310) and the authentication process may fail ("END"). If, on the other hand, the GUID is valid, the one or more servers 301 may then check whether the rest of the decrypted data is valid (step 312), such as whether the ECU address, vehicle identification information, and/or security seed is complete and comprises the correct number of bits. If not, the one or more servers 301 may return data indicative of the input parameters being invalid (step 314) and the authentication process may fail ("END"). If both the GUID is found to be valid in step 308 and the remaining decrypted data is found to be valid in step 312, the authentication process may proceed.

Figure 3C:
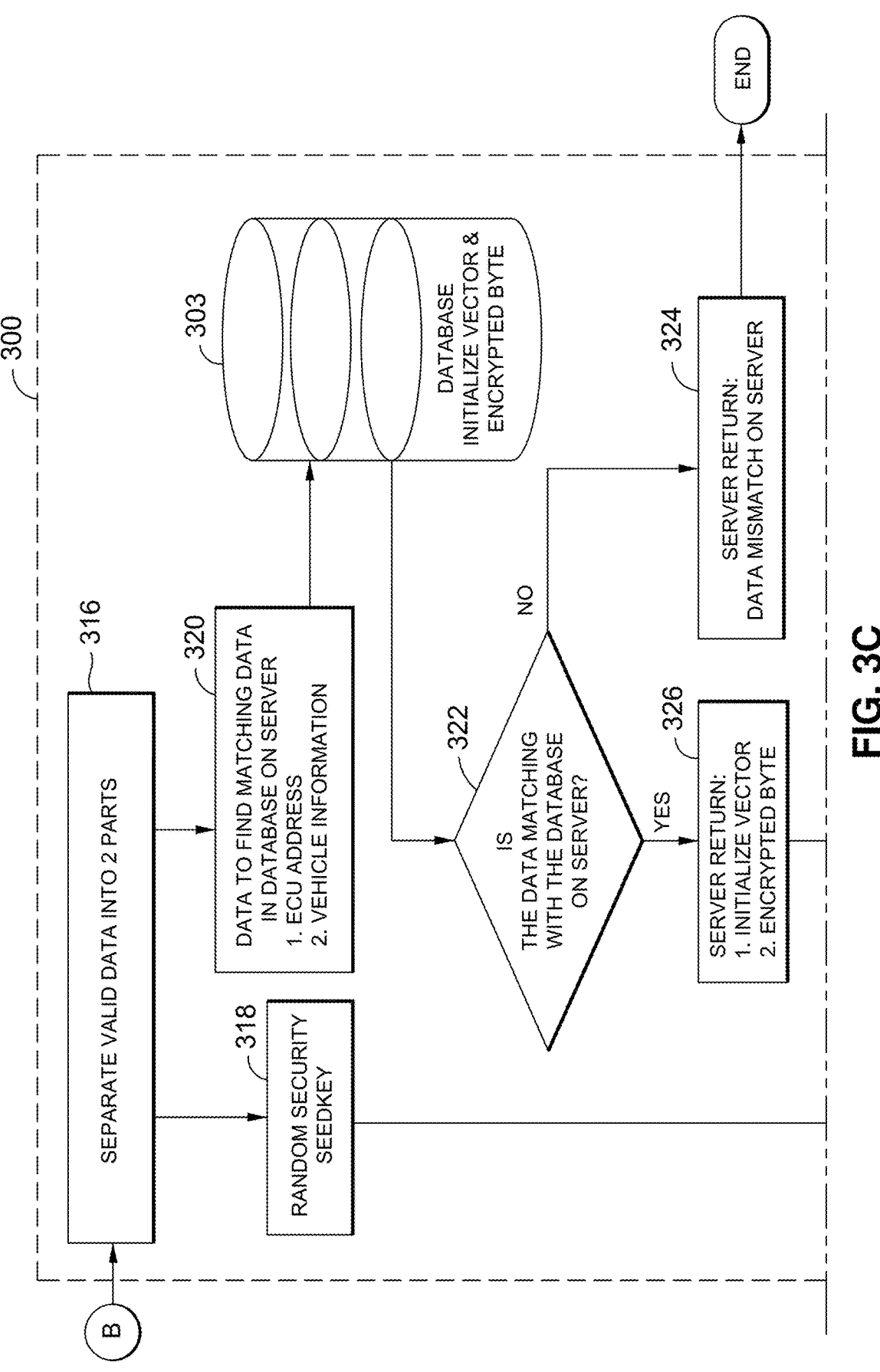
FIG. 3C shows a third portion of the operational flow.

Referring to FIG. 3C, the operational flow may continue with the one or more servers 301 of the backend system 300 separating the valid data into two parts (step 316), namely, a first part comprising the security seed (step 318) and a second part comprising the ECU address and the vehicle information (step 320), which will be used to retrieve authentication data such as an initialization vector as follows. The backend system 300 may include a database of vehicle-specific and/or ECU-specific authentication data (e.g., one or more items of authentication data for each combination of ECU 100 and vehicle information), which may be stored in the one or more data storages 303. The one or more servers 301 may match the decrypted ECU address and vehicle information (which was received by the diagnostic tool 200 as described above) with corresponding data in the database in order to read the correct authentication data. For example, in a case where the OEM uses the Advanced Encryption Standard (AES), e.g., ISO/IEC 18033-3 of the National Institute of Standards and Technology (NIST), the authentication data stored in the one or more data storages 303 may include an initialization vector and an encrypted fixed byte corresponding to each combination of ECU 100 and vehicle information. The initialization vector may be a hexadecimal number that functions as an initialization parameter, and the encrypted fixed byte may be another hexadecimal number that is the result of encrypting the initialization vector using a secret key according to an AES encryption algorithm. The authentication data for a given ECU 100, such as an anti-lock braking system (ABS) or a powertrain control module having a particular ECU address, may be different for each type of vehicle. For example, the authentication data stored in the database may indicate a first hexadecimal number as the initialization vector and second hexadecimal number as the encrypted fixed byte for a powertrain control module of a specific type of vehicle as defined by a year, make, model, and engine. The one or more servers 301 may search the database to see if there is stored authentication data (e.g., initialization vector and encrypted fixed byte) whose entry in the database matches the ECU address and vehicle information that was received from the ECU 100 by the diagnostic tool 200 (step 322). If there is not, the one or more servers 301 may return data indicative of a data mismatch (step 324) and the authentication process may fail ("END"). If, on the other hand, the data from the diagnostic tool 200 matches data stored in the database, then the stored authentication data (e.g., initialization vector and encrypted fixed byte) corresponding to that matching database entry may be returned (step 326). In this way, the one or more servers 301 may retrieve, from the database, an initialization vector and an encrypted fixed byte based on the ECU address and the vehicle identification information.

Figure 3D:
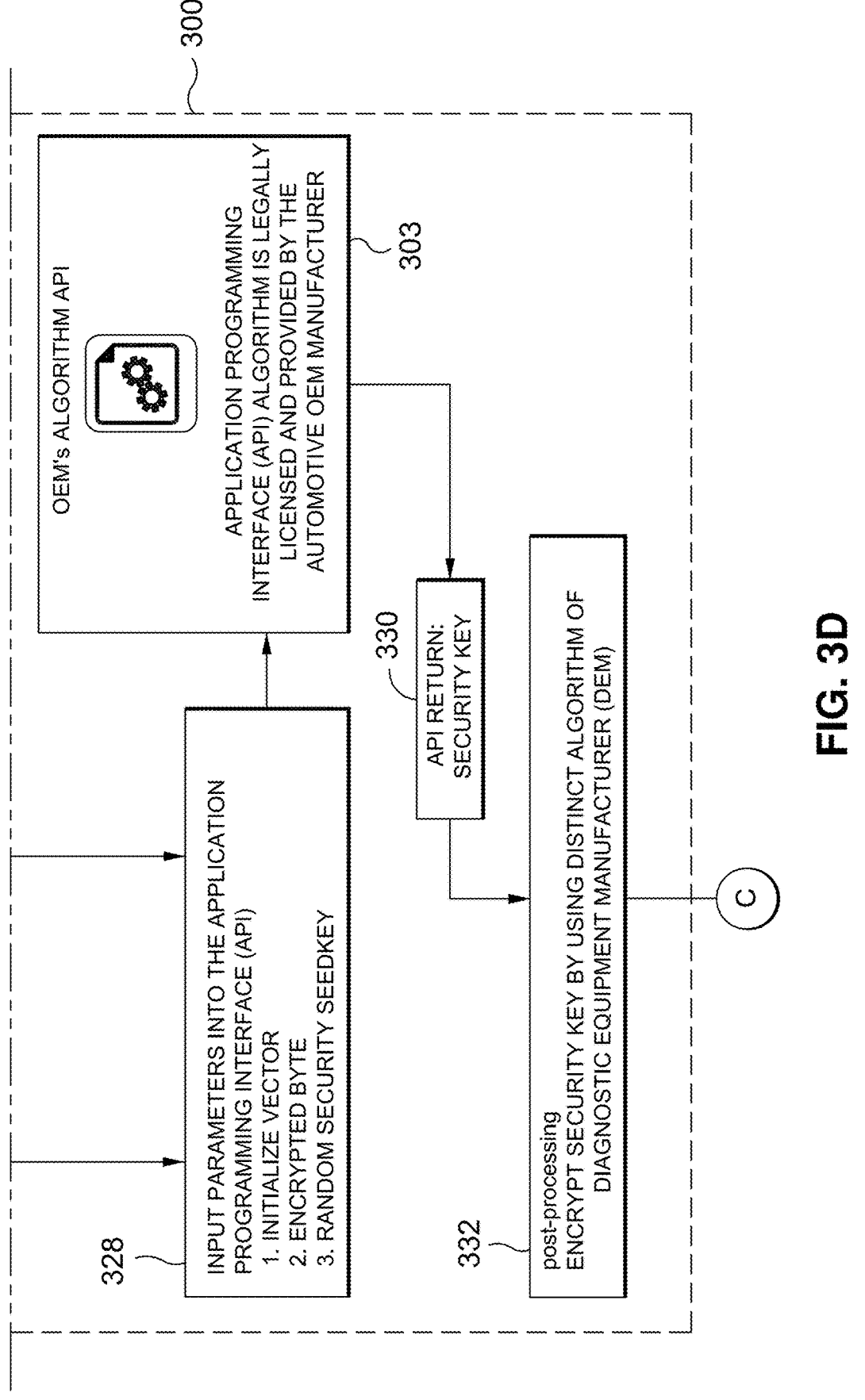
FIG. 3D shows a fourth portion of the operational flow.

Continuing on to FIG. 3D, the operational flow may continue with the one or more servers 301 inputting the authentication data (e.g., the initialization vector and the encrypted fixed byte), along with the security seed that was received from the ECU 100 by the diagnostic tool 200, to an application programming interface (API) associated with the OEM of the ECU 100. The API may be legally licensed and provided by the OEM to the ADEM for purposes of providing third-party two-factor authentication, for example, and may be stored in the one or more data storages 303 of the backend system 300. In a case where the OEM uses an AES encryption algorithm, for example, the API may first decrypt the encrypted fixed byte using the initialization vector and a secret key (e.g., the same secret key that was used to produce the encrypted fixed byte) to produce a decrypted fixed byte and then may use the decrypted fixed byte and the security seed as inputs to an algorithm (e.g., a proprietary algorithm of the OEM) that calculates the security key needed by the ECU 100. In this way, the one or more servers 301 of the backend system 300 may be operable to calculate the security key based on the initialization vector and the security seed using an API associated with an original equipment manufacturer (OEM) of the ECU 100 (step 330). In principle, the API may function as a black box whose details may be unknown to the ADEM. The one or more servers 301 may simply input the initialization vector, the encrypted fixed byte, and the security seed to the API and receive the calculated security key in return.

Figure 3E:
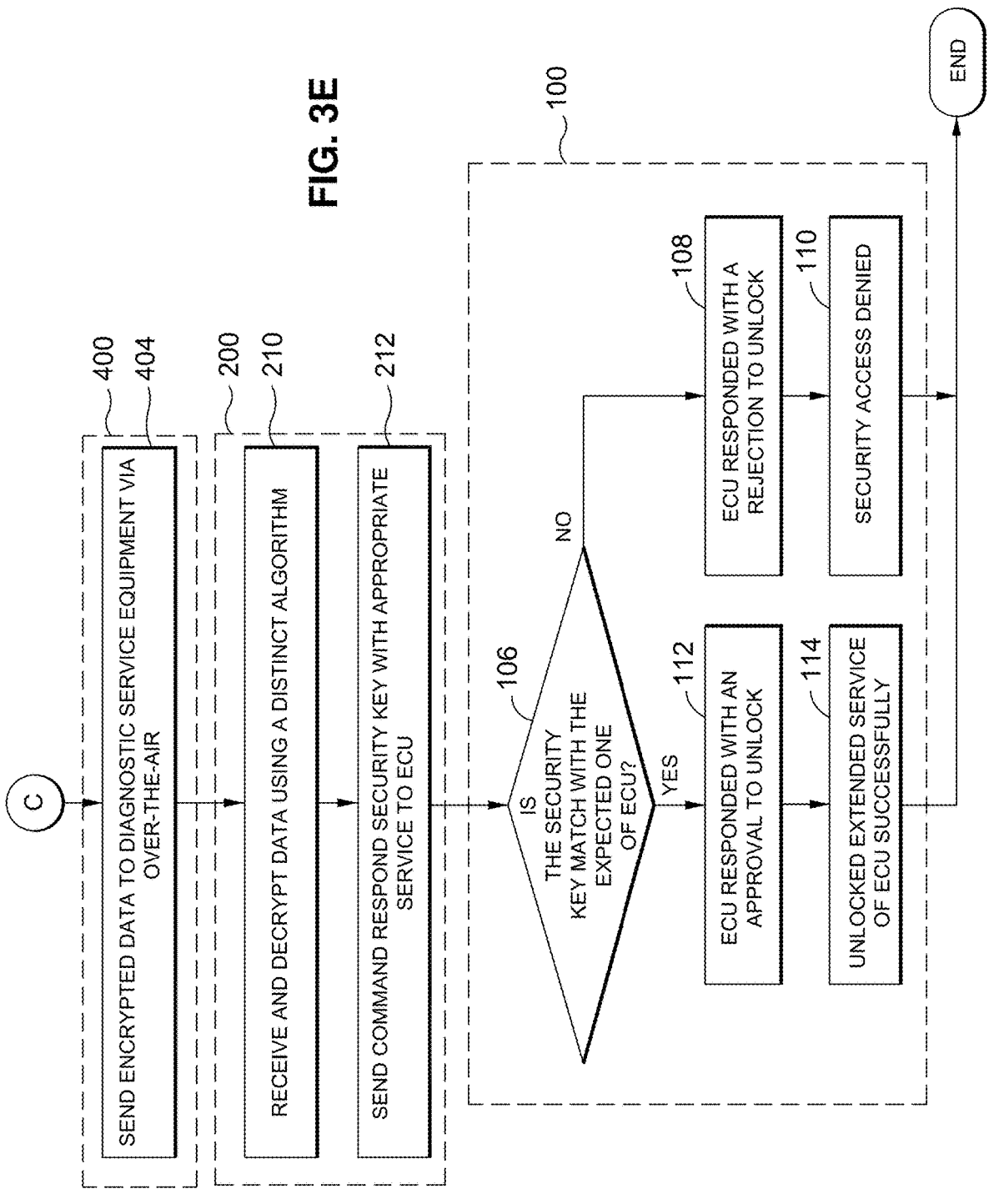
FIG. 3E shows a fifth portion of the operational flow.

Beginning at the bottom of FIG. 3D and continuing on to FIG. 3E, the operational flow may continue with the one or more servers 301 of the backend system 300 encrypting the security key (step 332). The encryption scheme may use the same algorithm known only to the manufacturer of the diagnostic tool 200, for example, which may be the same as the entity controlling the back-end system 300 having the one or more servers 301 as noted above. The one or more servers 301 may then send the encrypted security key to the diagnostic tool 200 over-the-air (step 404), e.g., over the Internet 400, to be decrypted and used by the diagnostic tool 200 to gain secure access to the ECU 100. In particular, the diagnostic tool 200 may receive and decrypt the encrypted security key using the same algorithm known only to the manufacturer of the diagnostic tool 200 (step 210) and may then send a response to the ECU 100 including the security key that is needed by the ECU 100 to continue with the requested functionality (step 212).

Upon receiving the security key, the ECU 100 may check whether the security key matches with the expected security key (step 106). If not, the ECU 100 may respond to the diagnostic tool 200 with a rejection to unlock the advanced functionality (step 108) and security access may be denied (step 110). If, on the other hand, the ECU 100 determines that the security key matches the expected security key, the ECU 100 may respond to the diagnostic tool 200 with an approval to unlock (step 112) and the extended service or other advanced functionality of the ECU 100 may be unlocked successfully (step 114). In this way, the ECU 100 may allow access to the diagnostic tool 200 only if the diagnostic tool 200 provides the correct security key, which the diagnostic tool 200 may obtain only by communicating over-the-air with one or more servers 301 belonging to a third-party with respect to the OEM of the ECU 100. As such, the ECU 100 may securely authenticate third-party diagnostic tools 200, enabling users and vehicle OEMs alike to benefit from aftermarket diagnostic methodologies. Once the diagnostic tool 200 is authenticated, features and functions that require authentication may be performed, such as bi-directional I/O control, routine control service, active test, special function, and high-level functions that may in some cases additionally require performance by NASTF certified technicians. Advantageously, the disclosed methodology may apply to various protocols including the ISO14229 and ISO15765-2 CAN international standards.

It is contemplated that the disclosed innovations may enable two-factor authentication, for example, as follows. A first authentication factor may be implemented by verifying the GUID of the device so as to require the process to be performed in an aftermarket tool that is associated with an account registered by the aftermarket diagnostic equipment manufacturer (ADEM). A second authentication factor may be the encryption process to secure the data before sending it to the server(s) and the decryption process upon receiving it from the scan tool, and vice versa with the returning process. The encryption scheme may use an algorithm known only to the manufacturer of the diagnostic tool, for example. All of the actions of the process may be recorded in a log by ADEM's server(s). Thus, reverse engineering can be prevented, as it is not feasible to fake a request to unlock security consecutively or simultaneously with reversing the security key and/or API algorithm. By way of comparison, the conventional process of unlocking the security in an ECU using "offline" algorithms integrated inside the microprocessor of the scan tool lacks a second authentication factor. As such, if a fake seedKey is sent to the microprocessor, there will be a chance to reverse the algorithm.

Referring back to FIG. 1, it is contemplated that the diagnostic tool 200 may function as a battery charger that may be capable of providing a minimally required charge to a vehicle battery in order to read data from a vehicle with a dead or near dead battery, for example, for purposes of determining if the vehicle is stolen. In this regard, the diagnostic tool 200 may comprise or be connected to a power supply 201 and may, as needed, provide auxiliary power from the power supply 201 to the ECU 100 (e.g., by powering the vehicle battery via the data port) in order to allow the diagnostic tool 200 to communicate with the ECU 100 as described herein. The power supply 201 may be the same power supply or a different power supply as may be used to power the diagnostic tool 200.

The functionality described above in relation to the components of the system 10 including the diagnostic tool 200 and the backend system 300 including the one or more servers 301 and one or more data storages 303 shown in FIG. 1, as well as the operational flow described in relation to FIGS. 2 and 3A-3E, may be wholly or partly embodied in one or more computers including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g. over the Internet 400), such as between the diagnostic tool 200 and the one or more servers 301 of the backend system 300, or between separate hardware components of the diagnostic tool 200 (e.g., a dongle and a smartphone). Performance of the described functionality by server(s), such as the one or more servers 301, may include performance of different steps or operations by different physical servers or other computers that communicate with each other to perform the described functionality.

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of supporting secure access to an electronic control unit (ECU) of a vehicle, the method comprising:

receiving, from a diagnostic tool connected to the vehicle, encrypted data including an ECU address corresponding to the ECU, vehicle identification information of the vehicle, and a security seed;

decrypting the encrypted data;

retrieving, from a database, an initialization vector based on the ECU address and the vehicle identification information;

calculating a security key based on the initialization vector and the security seed using an application programming interface (API) associated with an original equipment manufacturer (OEM) of the ECU;

encrypting the security key; and sending the encrypted security key to the diagnostic tool to be decrypted and used by the diagnostic tool to gain secure access to the ECU;

wherein the encrypted data further includes a global unique identification number (GUID) of the diagnostic tool, the method further comprising validating the GUID prior to retrieving the initialization vector from the database.

2. The method of claim 1, wherein said retrieving the initialization vector from the database includes finding a match in the database corresponding to the ECU address and the vehicle identification information.

3. The method of claim 2, wherein the vehicle identification information includes a year, make, and model of the vehicle.

4. The method of claim 1, wherein said calculating is further based on an encrypted fixed byte associated with the initialization vector.

5. The method of claim 4, wherein the method further comprises, prior to said calculating, decrypting the encrypted fixed byte using the initialization vector and a secret key.

6. The method of claim 1, wherein said decrypting, said retrieving, said calculating, said encrypting, and said sending proceed autonomously in response to said receiving.

7. A computer program product comprising one or more non-transitory program storage media on which are stored instructions executable by one or more processors or programmable circuits to perform operations for supporting secure access to an electronic control unit (ECU) of a vehicle, the operations comprising:

receiving, from a diagnostic tool connected to the vehicle, encrypted data including an ECU address corresponding to the ECU, vehicle identification information of the vehicle, and a security seed;

decrypting the encrypted data;

retrieving, from a database, an initialization vector based on the ECU address and the vehicle identification information;

calculating a security key based on the initialization vector and the security seed using an application programming interface (API) associated with an original equipment manufacturer (OEM) of the ECU;

encrypting the security key; and sending the encrypted security key to the diagnostic tool to be decrypted and used by the diagnostic tool to gain secure access to the ECU;

wherein the encrypted data further includes a global unique identification number (GUID) of the diagnostic tool, the operations further comprising validating the GUID prior to retrieving the initialization vector from the database.

8. The computer program product of claim 7, wherein said retrieving the initialization vector from the database includes finding a match in the database corresponding to the ECU address and the vehicle identification information.

9. The computer program product of claim 8, wherein the vehicle identification information includes a year, make, and model of the vehicle.

10. The computer program product of claim 7, wherein said calculating is further based on an encrypted fixed byte associated with the initialization vector.

11. The computer program product of claim 10, wherein the operations further comprise, prior to said calculating, decrypting the encrypted fixed byte using the initialization vector and a secret key.

12. A system for supporting secure access to an electronic control unit (ECU) of a vehicle, the system comprising:

a diagnostic tool operable to connect to the vehicle and to retrieve, from the vehicle, an ECU address corresponding to the ECU, vehicle identification information of the vehicle, and a security seed, the diagnostic tool further being operable to encrypt data including the ECU address, the vehicle identification information, and the security seed; and one or more servers operable to receive the encrypted data from the diagnostic tool, to decrypt the encrypted data, and to retrieve, from a database, an initialization vector based on the ECU address and the vehicle identification information, the one or more servers further being operable to calculate a security key based on the initialization vector and the security seed using an application programming interface (API) associated with an original equipment manufacturer (OEM) of the ECU, to encrypt the security key, and to send the encrypted security key to the diagnostic tool to be decrypted and used by the diagnostic tool to gain secure access to the ECU;

wherein the encrypted data further includes a global unique identification number (GUID) of the diagnostic tool, the one or more servers further being operable to validate the GUID prior to retrieving the initialization vector from the database.

13. The system of claim 12, wherein the diagnostic tool is operable to encrypt the data including the ECU address, the vehicle identification information, the security seed, and the GUID and send the encrypted data to the one or more servers autonomously in response to retrieving the ECU address, the vehicle identification information, and the security seed from the vehicle.

14. The system of claim 12, wherein the retrieving of the initialization vector by the one or more servers includes finding a match in the database corresponding to the ECU address and the vehicle identification information.

15. The system of claim 14, wherein the vehicle identification information includes a year, make, and model of the vehicle.

16. The system of claim 12, wherein the calculating of the security key by the one or more servers is further based on an encrypted fixed byte associated with the initialization vector.

17. The system of claim 16, wherein the one or more servers is further operable to decrypt the encrypted fixed byte using the initialization vector and a secret key prior to calculating the security key.

18. The system of claim 12, wherein the diagnostic tool is operable to connect to the vehicle via a data port of the vehicle.

* * * * *